United States Patent [19]
Hearn et al.

[11] Patent Number: 5,640,505
[45] Date of Patent: Jun. 17, 1997

[54] OPERATIONAL SUPPORT STRUCTURE FOR A TELECOMMUNICATIONS NETWORK

[75] Inventors: Richard Samuel Edwin Hearn, London; Robert Charles Bell, Croydon; Rodney Christopher Hall, Kent; Barry Sidney Farr, Buckinghamshire; Stephen John Harris, Middlesex; Colin Grantham; Catherine Spence, both of London; Terry Fellows, Hartfordshire; Michael James Spooner, Bedfordshire; Michael William Day, Middlesex; Nicholas John Furley, Buckinghamshire; Michael John Evans, Bedfordshire; Stephen Raymond Wells, Kent; Alan Dance, Hampshire; Ian Bryan Taylor, Ipswich; Eric Jenkin Williams, Liverpool; Philip Stephen Jones; Gerard Morrow, both of Suffolk; Stephen Andrew M. Wilson, Hertfordshire; John Allan Mountford, Milton Keynes; Simon Magnus Pyzer, Hertfordshire; Alistair John Lumpkin, Suffolk, all of England

[73] Assignee: British Telecommunications public limited company, London, England

[21] Appl. No.: 524,289

[22] Filed: Sep. 6, 1995

[30] Foreign Application Priority Data

Sep. 7, 1994 [EP] European Pat. Off. ............... 94306574

[51] Int. Cl.[6] ............................................... G06F 11/00
[52] U.S. Cl. .................. 395/182.02; 395/208; 395/228; 395/182.01; 379/201
[58] Field of Search ................ 395/182.02, 182.01, 395/183.03, 201, 208, 209, 228, 234; 379/201

[56] References Cited

U.S. PATENT DOCUMENTS 4,912,698  3/1990  Bitzinger ..................... 395/182.02 X
5,222,128  6/1993  Daly ................................. 379/221
5,276,861  1/1994  Howarth ........................ 395/182.02
5,416,833  5/1995  Harper ............................ 379/201
5,444,693  8/1995  Arslan ............................. 370/16
5,483,585  1/1996  Parker ............................. 379/201
5,519,772  5/1996  Akman ........................... 379/265
5,528,677  6/1996  Butler ............................. 379/196

OTHER PUBLICATIONS

Wilson, "Service Management Systems: Supporting the Customer Interface", British Telecommunications Engineering, vol. 13, No. 1, Apr. 1994, London GB, pp. 20–23.

Scheurer, Telcom Report, vol. 17, No. 1, Jan. 1994, Munchen De, pp. 12–15, "Einheitliches Management Fur Die Digitale Telekommunikationswelt".

(List continued on next page.)

Primary Examiner—Robert W. Beausoliel, Jr.
Assistant Examiner—Dieu-Minh Le
Attorney, Agent, or Firm—Nixon & Vanderhye P.C.

[57] ABSTRACT

A support structure for an operational telecommunications network deploys a set of individual technologies and provides a set of services to customers. The support structure is divided into a set of domains each of which provides a particular management function for the network. These domains include a domain for managing customer handling functions, a domain for managing the network, a domain for managing the individual technologies deployed in the network, a domain for managing instances of the individual services provided by the network, a domain for managing billing operations, a domain for managing the services provided by the network when grouped together to form a portfolio, and a domain for managing jobs performed by the human workforce for the network. Each domain has its own set of databases and systems for performing the required management operations and also interfaces to some of the other domains. Each domain is implemented by one or more tightly integrated computers. The interfaces between the domains are primarily message passing interfaces.

20 Claims, 8 Drawing Sheets

OTHER PUBLICATIONS

Helleur et al, "Network Administration Support System Development", British Telecommunications Engineering, vol. 9, No. 3, Oct. 1990, London GB, pp. 179–186.

Campbell et al, "A Layered Approach to Network Management Control", IEEE 92 Network Operations and Management Symposium, vol. 1, 1992, Memphis (US), pp. 46–56.

Stinson et al, "Design and Deployment of an Integrated Network Management System for a Large Telco Network", 94 IEEE Network Operations and Management Symposium, vol. 1, 14 Feb. 1994, Orlando (US), pp. 36–48.

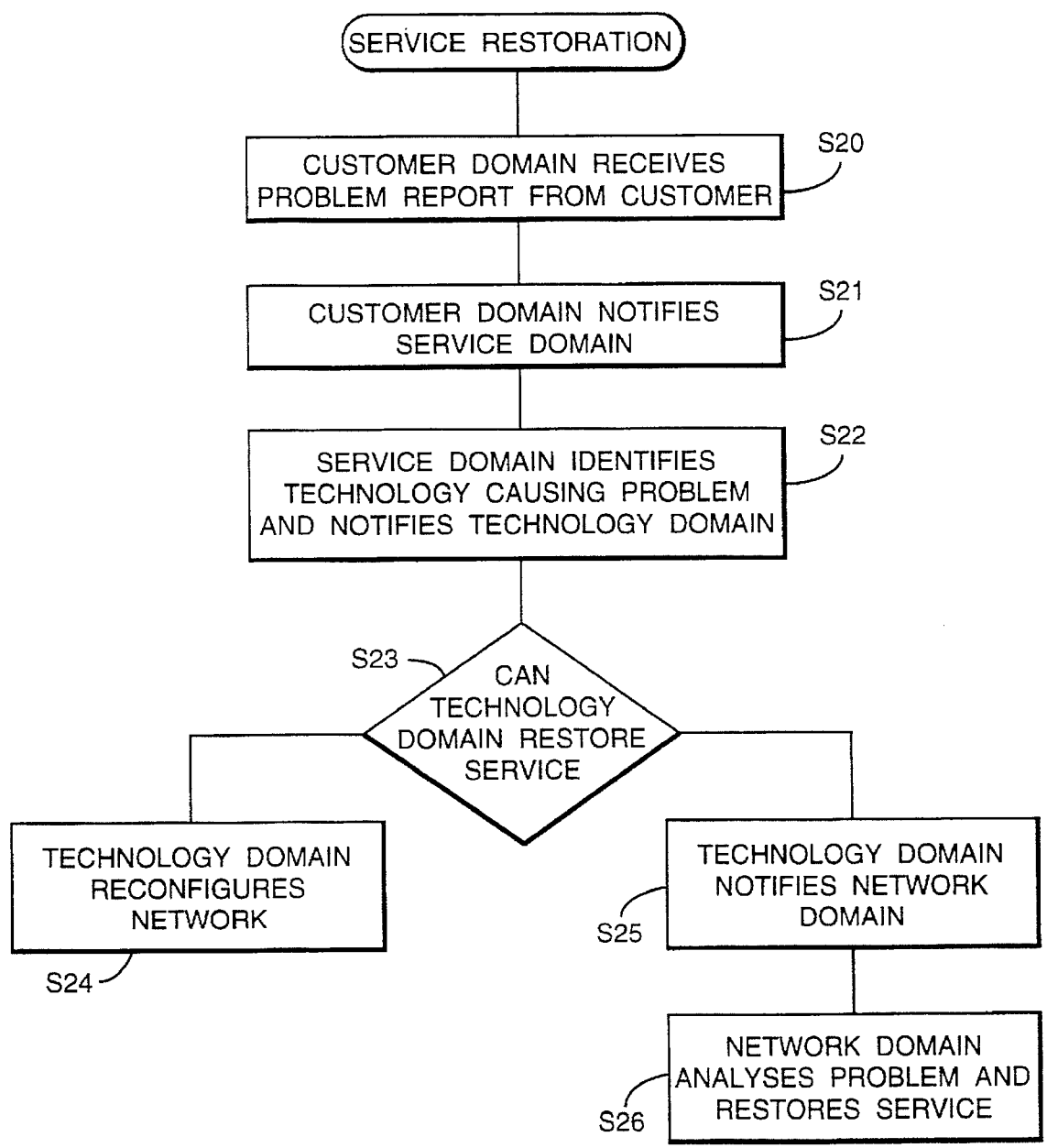

OPERATIONAL SUPPORT STRUCTURE FOR A TELECOMMUNICATIONS NETWORK

BACKGROUND OF THE INVENTION

Field of the Invention

This invention relates to an operational support structure for a telecommunications network, A modern public telecommunications network comprises a highly complex network of communication links connected to each other at nodes. Such a network deploys a wide range of technologies and provides a wide range of services. Such a network requires an operational support structure comprising many different operational support systems which perform many different functions. The support systems cooperate to provide overall operations, for example providing and restoring services to customers. As the complexity of a network and the number of technologies deployed in it increases, the number and complexity of the operational support systems also increases. This creates the problem of arranging the support systems so that they can cooperate efficiently with each other and so that there is minimum duplication of databases.

According to a first aspect of this invention, there is provided an operational support structure for, and in combination with, a telecommunications network, said telecommunications network deploying a set of individual technologies and providing a set of services to customers of the network;

said operational support structure being divided into a set of domains each of which provides an individual management function for the network, each domain being implemented by at least one computer;

each domain comprising at least one database containing data related to the management function provided by the domain, at least one system for performing operations related to the management function provided by the domain, said at least one system having access to said data related to the management function provided by the domain, and means for providing an interface between the domain and at least one other domain;

said domains including:
a domain for managing customer handling functions;
a domain for managing instances of the individual services provided by the network;
a domain for managing the individual technologies deployed in the network; and
a domain for performing network management operations;

the domain for managing customer handling functions including a customer handling system arranged to receive a request from a customer for the provision of a new service and to transmit a request for the provision of a new service to the domain for managing the individual services;

the domain for managing the individual services including a service management system and a database containing details of the technology configurations which are required to provide network services, said service management system being arranged to receive a request for a new service from the domain for managing customer handling systems, to determine the technology configuration required using at least one of the technologies deployed in the network to provide the new service, and to send a request to the domain for managing the individual technologies to configure the network to provide the new service.

SUMMARY OF THE INVENTION

The domain for managing the individual technologies including an element manager system, said element manager systems being arranged to receive a request from the domain for managing the individual services to configure the network to provide a new service, and to configure the networks in response to such a request.

According to a second aspect of this invention, there is provided an operational support structure for, and in combination with, a telecommunications network, said telecommunications network deploying a set of individual technologies and providing a set of services to customers of the network;

said operational support structure being divided into a set of domains each of which provides an individual management function for the network, each domain being implemented by at least one computer;

each domain comprising at least one database containing data related to the management function provided by the domain, at least one system for performing operations related to the management function provided by the domain, said at least one system having access to said data related to the management function provided by the domain, and means for providing an interface between the domain and at least one other domain;

said domains including:
a domain for managing customer handling functions;
a domain for managing instances of the individual services provided by the network;
a domain for managing the individual technologies deployed in the network; and
a domain for performing network management operations;

the domain for managing customer handling functions including a customer handling system arranged to receive a report from a customer relating to a problem which has caused a loss of service and to transmit details of the problem report to the domain for managing the individual services;

the domain for managing the individual services including a service management system which is arranged to receive the details of the problem report from the domain for managing customer handling functions, to identify the technology which is causing the problem and to transmit details of the problem to the domain for managing the individual technologies;

the domain for managing the individual technologies including a fault manager system which is arranged to receive details of a problem causing a loss of service from the domain for managing the individual services, to determine if service can be restored by reconfiguring the network, and, where possible, to reconfigure the network so as to restore the lost service, According to a third aspect of this invention, there is provided an operational support structure for, and in combination with, a telecommunications network, said telecommunications network deploying a set of individual technologies and providing a set of services to customers of the network;

said operational support structure being divided into a set o domains each of which provides an individual management function for the network, each domain being implemented by at least one computer;

each domain comprising at least one database containing data related to the management function provided by the domain, at least one system for performing operations related to the management function provided by the domain, said at least one system having access to said data related to the management function provided by the domain, and means for providing an interface between the domain and at least one other domain;

said domains including:
- a domain for managing customer handling functions which includes a customer handling system;
- a domain for managing instances of the individual services provided by the network which includes a service management system;
- a domain for managing the individual technologies deployed in the network which includes at least one element manager system; and
- a domain for performing network management operations which includes a problem manager system.

According to a fourth aspect of this invention, there is provided an operational support structure for, and in combination with, a telecommunications network, said telecommunications network deploying a set of individual technologies and providing a set of services to customers of the network;

said operational support structure comprising a customer handling system, a service management system and an associated database containing details of the technology configurations which ere required to provide network services, and a set of element manager systems each of which is arranged to manage an individual one of said technologies;

the customer handling system being arranged to receive a request for the provision of a new service from a customer and to transmit a request for the provision of a new service to the service management system;

the service management system being arranged to receive a request for a new service from the customer handling system, to determine the technology configuration required using at least one of the technologies deployed in the network, and to send a request to at least one of the element managers to configure the network to provide the new service; and each element manager being arranged to receive a request from the service management systems to configure the network to provide a new service and to configure the network in response to such a request.

According to a fifth aspect of this invention, there is provided an operational support structure for, and in combination with, a telecommunications network, said telecommunications network deploying a set of individual technologies and providing a set of services to customers of the network;

said operational support structure comprising a customer handling system, a service management system and an associated database containing details of the technology configurations which are required to provide network services, and a set of fault manager systems each of which is arranged to manage faults in an individual one of said technologies;

the customer handling system being arranged to receive a report from a customer rotating to a problem which has caused a loss of service and to transmit details of the problem report to the service management system;

the service management system being arranged to receive details of a problem report from the customer handling system, to identify the technology which is causing the problem and to transmit details of the problem to an appropriate one of the fault manager systems; and each fault manager system being arranged to receive details of a problem causing a loss of service from the service management systems, to determine if service can be restored by reconfiguring the network, and, where possible, to reconfigure the network so as to restore the lost service.

According to a sixth aspect of this invention, there is provided a method of providing a new service for a customer in a telecommunications network, said telecommunications network deploying a set of individual technologies and providing a set of services to customers of the network; said method comprising the steps of:

in a customer handling system, receiving a request for the provision of a new service from a customer and transmitting a request for the provision of the new service to a service management system;

in the service management system receiving the request for the new service from the customer handling system, determining the technology configuration required using at least one of the technologies deployed in the network, and sending a request to at least one of a set of element manager systems to configure the network to provide the new service; and in the or each element manager system which receives a request from the service management system, configuring the network in response to the request;

each of said systems being implemented by a computer.

According to a seventh aspect of this invention, there is provided a method of restoring a loss of service in a telecommunications network, said telecommunications network deploying a set of individual technologies and providing a set of services to customers of the network, said method comprising the steps of:

in a customer handling system, receiving a report from a customer relating to a problem which has caused a loss of service and transmitting details of the problem report to a service management system;

in the service management system, receiving details of the problem report from the customer handling system, identifying the technology which is causing the problem, and transmitting details of the problem to an appropriate one of a set of fault manager systems each of which manages faults for a particular one of said technologies; and in the fault manager system which receives details of the problem causing the loss of service from the service management system, determining if service can be restored by reconfiguring the network and, where possible, reconfiguring the network so as to restore the loss of service.

each of said system being implemented as a computer.

BRIEF DESCRIPTION OF THE DRAWINGS

This invention will now be described in more detail, by way of example, with reference to the drawings in which:

FIG. 13 is a flow chart of the steps which are performed in restoring a toss of service.

DETAILED DESCRIPTION OF EXEMPLARY EMBODIMENTS

A modern telecommunications network owned by a public telecommunications company comprises a highly complex network of communication links connected to each other at nodes. Such a network deploys a wide range of technologies and provides a wide range of services to both residential and business customers. Such a network requires an operational support structure comprising many different support systems which perform many different functions. The support systems cooperate to provide overall operations which include providing and restoring services to customers. Each system needs access to one or more databases and the support systems interact with each other and the network in order to perform their functions.

As the complexity of a network and the number of technologies deployed in it increase, the number of and complexity of the support systems and their size also increases. The number o services, the number of instances of each service and the rate at which new services and instances of each service are created will all increase. A single computer will not be able to provide the operational support structure for a large telecommunications network. This creates the problem of arranging the support systems so that They can cooperate efficiently with each other despite their size and so that there is minimal duplication of databases. Duplication or databases can cause difficulties in maintaining data consistency among the duplicated databases.

There will now be described an operational support structure which is divided into a set of domains, each of which provides a particular management function. Each domain has one or more databases which contain data related to the management function provided by the domain and one or more systems which have access to the data.

By dividing the operational support structure into domains according to management function, the databases within each domain can be shared efficiently, the duplication of databases is minimised and the various systems can cooperate with each other in an efficient manner, both within each domain and between domains, when performing various operations such as providing and restoring services to customers. Also, because the domains are established according to management functions, when a new system or database is added to a particular domain, the overall resulting stress on the operational support structure is contained.

Figure 1:
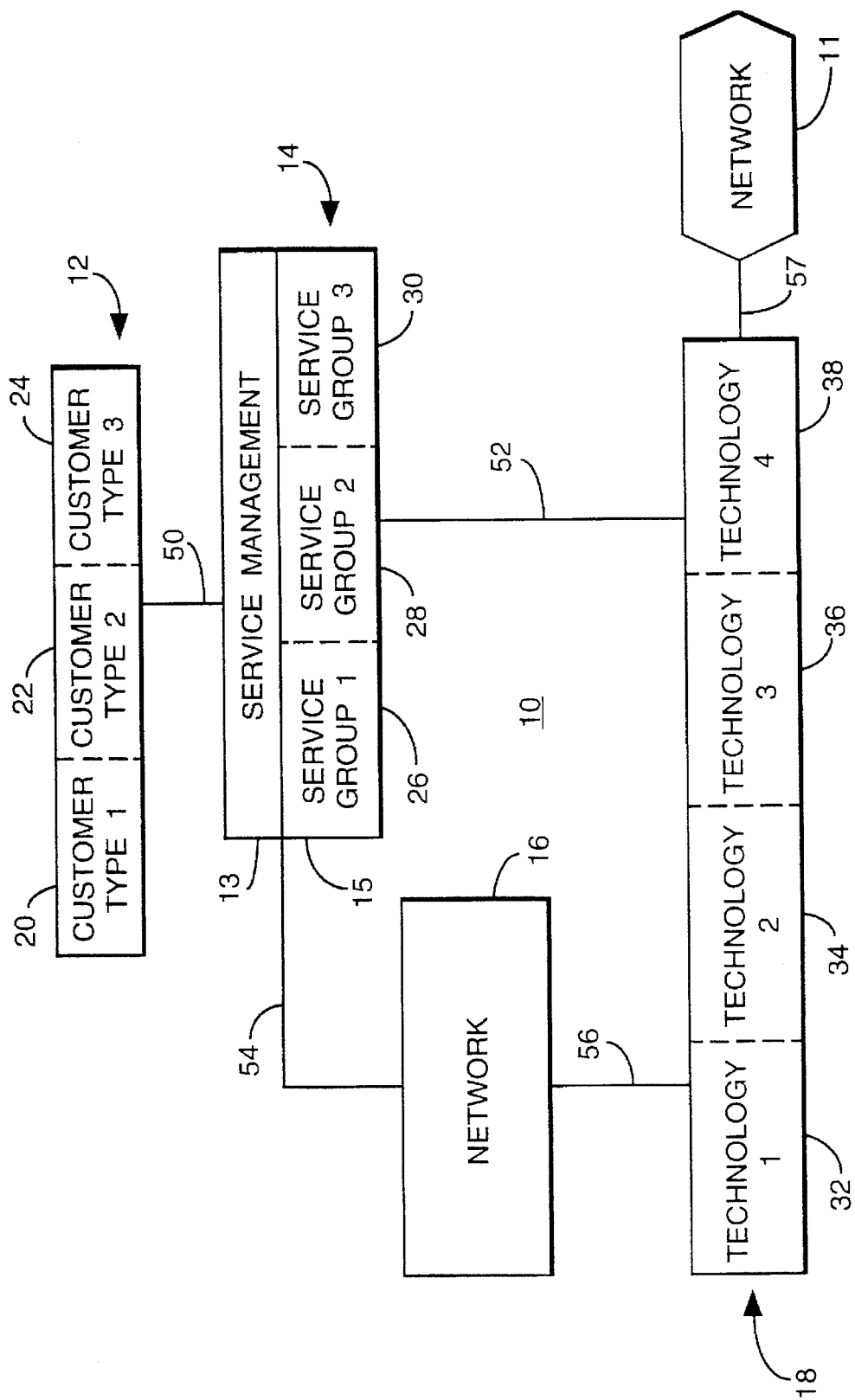
FIG. 1 is a block diagram of an operational support structure for a telecommunications network divided into four basic domains, each of which provides a particular management function, the support structure embodying this invention.

Four basic domains have been identified and a support structure which includes these four basic domains is shown in FIG. 1.

Referring now to FIG. 1, there is shown a support structure 10 for a telecommunications network 11 divided into four basic domains. These domains comprise a domain 12 for managing customer handling functions, a domain 14 for managing instances of the individual services provided by the network, a domain 16 for managing the network 11 and a domain 18 for managing the individual technologies deployed in the network. The domain 14 is responsible for managing each instance of each service. An instance of a service is the provision of a particular service for a particular customer.

Figure 11:
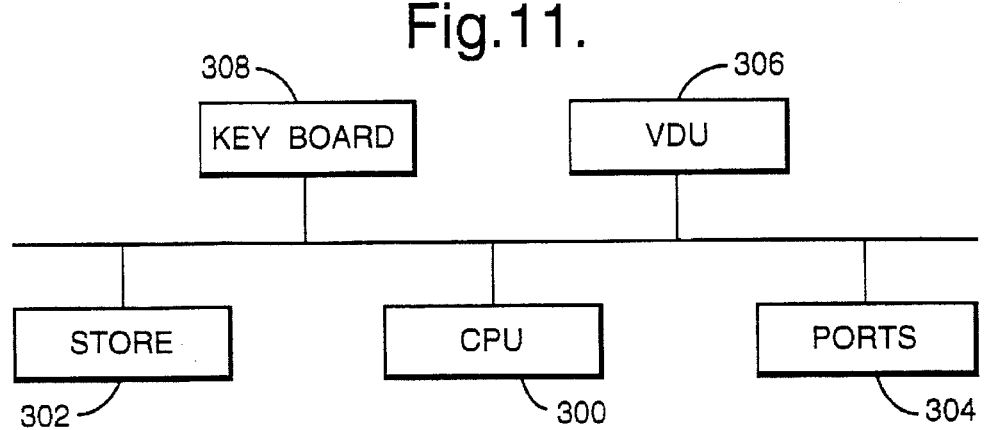
FIG. 11 is a block diagram of the components of a computer.

Each domain is implemented as either a single computer or a set of computers tightly integrated with each other. An example of the main components of a computer which is suitable for use in one of the domains is shown in FIG. 11. The main components include a central processing unit (CPU) 300, a store 302, a set of ports 304, a visual display unit (VDU) 306 and a keyboard 308. The ports 304 can be used to connect the computer to other computers, both within its domain and in other domains, and to peripheral equipment such as printers. The store 302 is formed from hard disk, read-only-memory (ROM) and random-access-memory (RAM).

The store 302 contains the programs which control the computer. In each domain, the individual support systems are implemented as computer programs. Also, in each domain, the data belonging to each database is held in the store of a computer which is provided with a database management system.

The domains will now be described in more detail. The domain 12 for managing customer handling functions is divided into three segments 20, 22 and 24, each of which is responsible for managing the handling functions of a particular type of customer. For example, the segment 20 may be responsible for handling residential customers while the segments 22 and 24 are responsible, respectively, for handling small and large business customers. Examples of customer handling functions performed by the domain 12 are handling orders from customers, for example for new lines or new services such as call forwarding, and handling complaints from customers on faults in the network. All communications between the customers and the operational support structure are made via the domain 12.

The domain 14 for managing instances of the individual services is divided into two sections, namely a section 13 which provides an overall service management function and a section 15. The section 15 is divided into segments 26, 28, 30, each of which is responsible for managing instances of a group of services. The segment 26 manages instances of a first group of services and in the present example these comprise telephony services. The segment 28 manages instances of a second group of services and in the present example these comprise private circuits for business customers. The segment 30 manages instances of a third group of services and in the present example this comprises special services such as paging, video conferencing, telemetry and home shopping. Each of the segments 26, 28, 30 deals with typically two or three technologies to provide its group of services. A particular technology may be used by more than one segment. On receiving an order for a new instance of a particular service, the service management section 13 selects the appropriate one of segments 26, 28, 30 to provide that service.

The section 15 may include further segments for managing instances of further groups of services. The section 15 may also include two or more segments which manage groups of services of the same general nature but which are provided by different technologies. For example, there could be a segment which provides telephony services in which the final connection to a customer's premises is over copper wires and a segment which provides telephony services in which the final connection to a customer's premises is over optical fibres. With this arrangement, the management section 13 might select the segment which provides telephony services over copper wires to the customer's premises for an order for a small number of new lines and the segment which provides telephony services over optical fibre to the customer's premises for a large number of new lines. Functions performed by the domain 14 include maintaining data on the technology configurations required to provide the individual services, generating requests to other parts of the support structure in order to execute an order from a customer for a new service and monitoring the performance of the individual services.

The domain 16 for managing the network 11 is not divided into segments and this domain is responsible for certain management functions relating to the whole network. Functions performed by this domain include correlating faults received from various parts of the network, managing traffic and monitoring network performance.

The domain 18 for managing the individual technologies is divided into segments, each of which is responsible for managing a particular technology. For reasons of simplicity, FIG. 1 shows the domain 18 divided into only four segments, namely segments 32, 34, 36 and 38. However, in practice, a greater number of technologies is likely to be deployed in a telecommunications network. Examples of such technologies include the individual types of switch deployed in the telecommunications network, the service control points of an intelligent network, the various technologies used in the transmission of information (including voice and data) within the network such as Plesiochronous Digital Hierarchy (PDH), Synchronous Digital Hierarchy (SDH) and Asynchronous Transfer Mode (ATM), and individual servers for providing various services such as telemetry.

FIG. 1 shows some interfaces between the domains. The interfaces shown in FIG. 1 comprise an interface 50 between domains 12 and 14, an interface 52 between domains 14 and 18, an interface 54 between domains 14 and 16, an interface 56 between domains 16 and 18 and an interface 57 between domain 18 and the network 11. The interfaces serve to transmit requests, responses and data between domains. The interfaces are implemented as primarily message passing interfaces between computers. Some exemplary uses of these interfaces will now be described, When the domain 12 receives an order from a customer for a new service, this domain transmits a request on the interface 50 to the domain 14 to establish the service. The domain 14 then determines the technology configuration needed to provide the service and transmits appropriate requests on the interface 52 to the domain 18. The domain 18 is then responsible for making the necessary configurations in the network and, when these are made, sends a response on the interface 52 to the domain 14. The domain 14 then transmits a response on the interface 50 to the domain 12 to inform the domain 12 that the service has been established. The domain 18 transmits performance and fault data on the interface 56 to the network domain 16. The domain 16 transmits requests on the interface 56 to the domain 18 to control traffic within the network. The domain 16 also transmits performance data on the interface 54 to the domain 14 and this data is then used by domain 14 to assess performance of the services.

Figure 2:
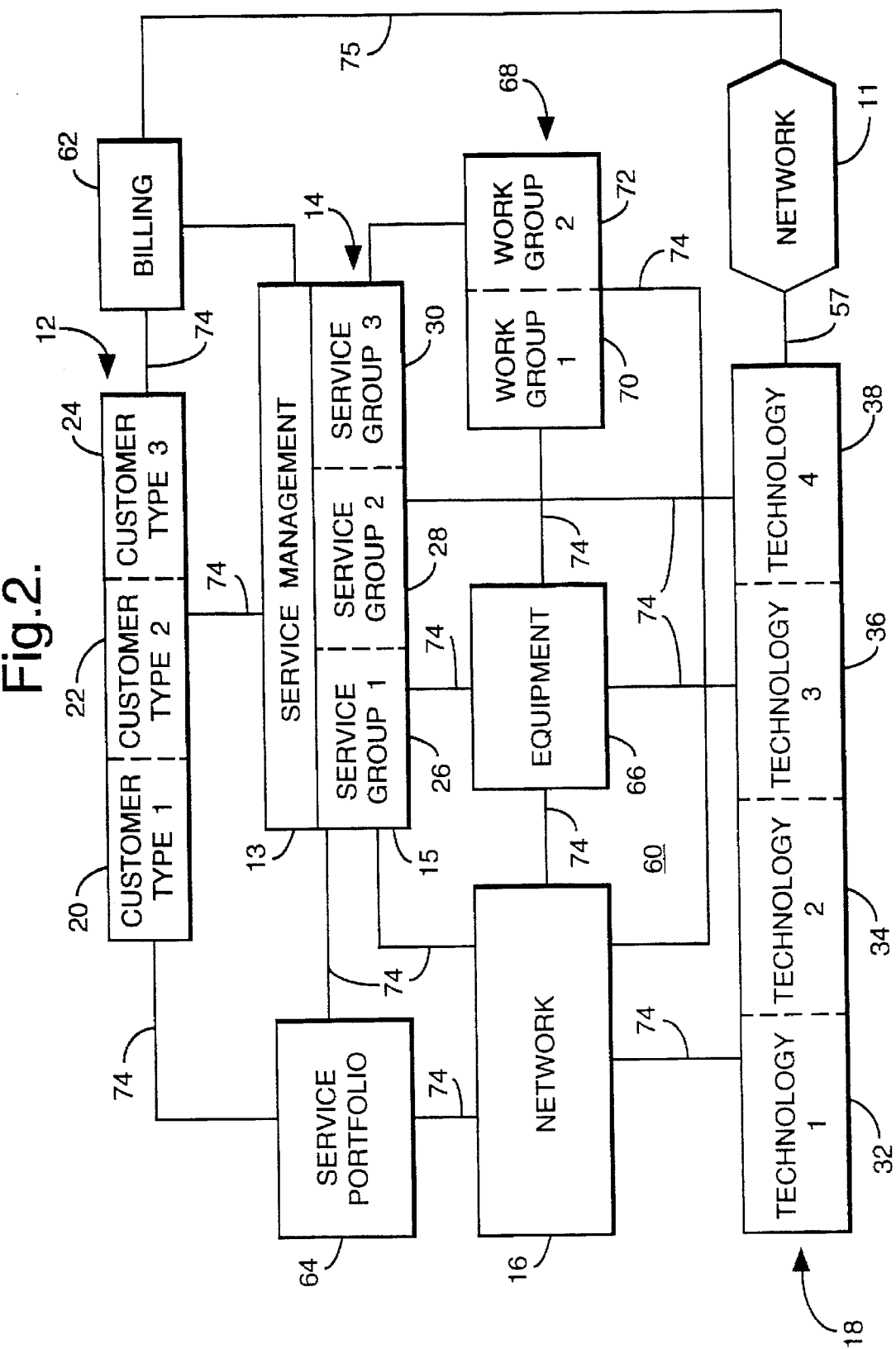
FIG. 2 is a block diagram of an operational support structure for a telecommunications network which includes the four basic domains shown in FIG. 1 and four additional domains.

As explained above, FIG. 1 shows a support structure 10 divided into four basic domains, each of which provides a particular management function. FIG. 2 shows a support structure 60 which includes the four basic domains of FIG. 1 and four additional domains. In FIG. 2, the four basic domains which correspond to the four basic domains of FIG. 1 and also the network are denoted by the same reference numerals as those used in FIG. 1. The four additional domains comprise a domain 62 for managing billing operations, a domain 64 for managing the services when grouped together to form a portfolio of services, a domain 66 for managing the individual items of equipment deployed in the network and a domain 68 for managing jobs performed by the network's human workforce.

In more detail, the functions of the domain 62 for managing billing operations include generating bills for customers, monitoring customers' accounts and issuing account statements and managing billing problems.

The functions of the domain 64 for managing the portfolio of services include planning new services, launching new services and withdrawing old services. It holds data relating to available services, The functions of the domain 66 for managing the individual items of equipment deployed in the network include maintaining an inventory of the details (including physical location) of the individual items of physical equipment used in the network, maintaining a schedule for routine Servicing of the individual items of equipment and maintaining details of faults reported on these items.

As may be observed from FIG. 2, each of the domains 62, 64 and 66 is not divided into segments. In contrast, the domain 68 for managing the jobs performed by the workforce is divided into two segments, namely segment 70 and segment 72. Each of these segments is responsible for a particular group of human operatives. For example, the segment 70 may be responsible for operatives who carry out jobs within the network and the segment 72 may be responsible for operatives who carry out jobs in the customers' premisese. The Jobs which are performed by the workforce may include routine servicing of equipment, servicing of equipment to remove faults, configuring equipment to provide services and installing and maintaining equipment in customers' premises.

FIG. 2 shows interfaces between the various domains and each of these interfaces is denoted by reference numeral 74. The interfaces 50 to 56 shown in FIG. 1 and the interfaces 74 shown in FIG. 2 represent only some examples of interfaces between domains. FIG. 2 also shows the interface 57 between domain 18 and the network 11 and an interface 75 between the domain 62 and the network 11. In practice, further interfaces will be required.

The individual domains shown in FIG. 2 will now be described in more detail with reference to FIGS. 3 to 10. In these figures, databases are represented by cylinders and the various systems for performing the various functions within the domains are represented by rectangular boxes.

As mentioned with reference to FIGS. 1 and 11, each domain is implemented as either a single computer or a set of computers which are closely coupled and tightly integrated with each other. Each computer is used in only one domain and computers are not shared between domains. The individual support systems are implemented as computer programs and the data belonging to each database is held in a compute store. Functions on separate domains are more loosely coupled together than the functions within a domain. The interfaces between domains are primarily message passing interfaces between computers.

In FIGS. 3 to 10, each of the systems is labelled with an appropriate name. Some of the names chosen for the systems, such as element manager, are already well known terms of art. Other names chosen, such as the job scheduler, are generally self-explanatory of the general nature of the systems which they denote.

Figure 3:
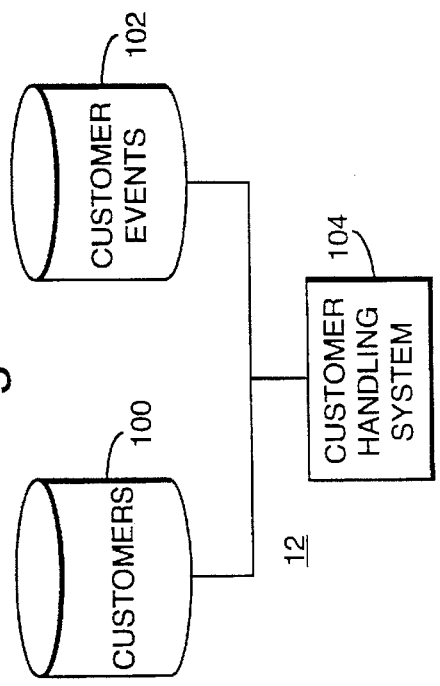
FIG. 3 is a block diagram of a domain for managing customer handling functions and forming part of the support structure shown in FIG. 2.

Referring now to FIG. 3, there are shown the components of one of the segments of the domain 12 for managing customer handling functions. The general layout of each of the segments is the same and so only one of these segments will be described. The segment shown in FIG. 3 comprises a database 100 of the details of the customers handled by the segment, a database 102 for containing a record of each contact made with a customer and a customer handling system 104. Details of customers held in database 100 include names, locations and telephone numbers. Examples of contacts with customers include a request for information about services provided by the network, an order for a new service, a request for a report on the performance of a service provided to a customer, a report of a fault and a billing enquiry. Such contacts from customers are made in a variety of ways and may be received for example by telephone, post or in the form of an electronic message from a customer's computer. For example, a residential customer may make a request for a new telephone line by making a telephone call to an operator while a request from a large business customer for the provision of a private line having a specified bandwidth for a specified period of time may be received in the form of an electronic message transmitted from an apparatus known as a network manager located in the customer's premises. Regardless of the manner in which each contact is made, it is recorded in the database 102.

Some examples of the processing of contacts with customers will now be described. If a customer enquires about services provided by the network, the domain 12 retrieves details of appropriate services from the domain 64 which is responsible for managing the portfolio of services. If the domain 12 receives an order for a new service, it transmits the order to the domain 14 for managing the services provided by the network. The order is then processed in the domain 14 so as to provide the required service. If a customer requests a report on a particular service, the request is passed to the domain 14 which generates the required report and transmits this back to the domain 12. If a customer reports a fault, this is reported to the domain 14 which then investigates the fault and reports back to the domain 12 after the fault has been dealt with. A billing enquiry is transmitted to the domain 62 for managing billing operations. This domain then deals with the billing enquiry and sends a reply to the domain 12.

As outlined above, section 15 of domain 14 is divided into three segments 26, 28, 30, each of which is responsible for managing instances of a group of services. In the present example, the segment 26 is responsible for managing instances of telephony services. The group of telephony services includes both the basic telephony service and additional services such as call forwarding and three-way calling. The general layout of each of the segments 26, 28, 30 is the same and the layout of one of these segments is shown in FIG. 4.

Figure 4:
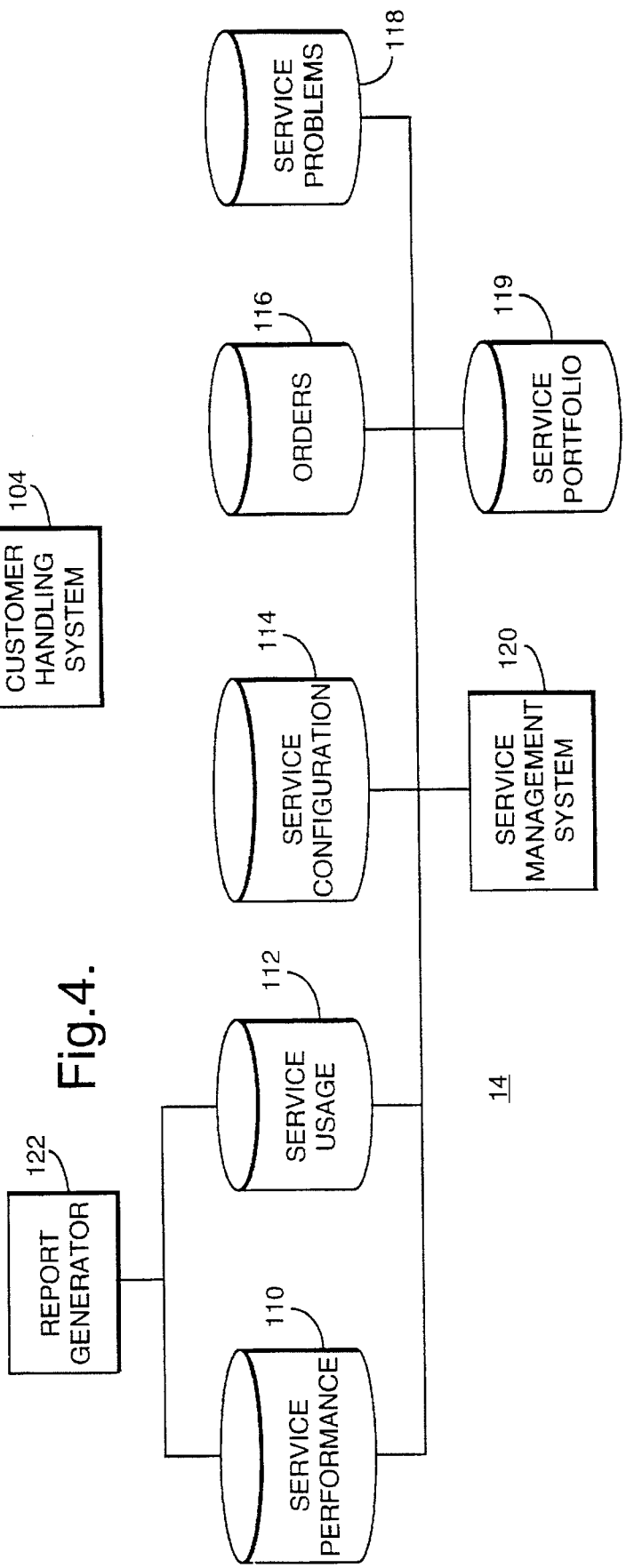
FIG. 4 is a block diagram of a domain for managing instances of the individual services provided by the network and forming part of the support structure shown in FIG. 2.

Referring now to FIG. 4, the segment includes a database 110 containing details of service performance, a database 112 containing details of service usage, a database 114 which contains data on the technology configuration used to provide each instance of each service, a database 116 which contains a record of each order for an instance of a service, a database 118 which contains records of service problems and a database 119 which contains the rules which defined the technology configurations which may be used to provide instances of the various services which form the portfolio of available services. For example, in the case of a 2 megabit/second link between two end points, the rules might specify the technologies which may be used for the end legs of the link, and the technologies which may be used for the core legs of the link. The database 119 is a duplicate of the relevant part of the database 180 in domain 64. The segment also includes a service management system 120 and a report generator 122. The functions performed by the service management system 120 include the provision of new instances of services, cessation, suspension and resumption, and modification of existing services, and also the restoration of services in the event of faults in the network.

When the service management system 120 receives an order from the domain 12 for a new instance of a service, it logs the order in the database 116 and then retrieves the rules which define the possible technology configurations to provide the service from the database 119, Using this data, the service management system 120 determines the changes which need to be made to the network to provide the new service instance. It then transmits requests to the domains 18, 66 and 68 to provide the required configuration. It also transmits data of the new service to the domain 62 for managing billing operations and this data is then used by the domain 62 in preparing bills to customers.

When the service management system receives a report of a fault from a customer, it logs the details of the fault in the database 118, retrieves details of the service instance provided to the customer from the database 116 and details of the technology configuration used to provide this service from the database 114. By processing the data from databases 114 and 119, it determines the action which is necessary to restore the service. It then transmits appropriate requests to technology domain 18 so as to achieve service restoration. The service management system 120 also receives details of faults from other domains, such as the domain 116 for managing the network. By retrieving data from databases 114 and 116, it can identify the services which are affected by the faults and transmit appropriate reports to the domain 12 which in turn transmits reports to customers.

The service management system 120 can also be used for testing proposed services. Details of these new services are received from the domain 64 for managing the portfolio of services.

The service management system 120 also receives information from the other domains relating to service performance and service usage. After analysis, this data is stored in the databases 110 and 112. If the domain 14 receives a request from the domain 12 relating to either service performance or service usage, the report generator 122 retrieves data as appropriate from databases 110 and 112 and prepares a report which is transmitted back to the domain 12.

The domain 16 for managing the network views the various technologies deployed in the network in an integrated way. It addresses issues which cannot be addressed within the scope of the individual segments of the domain 18 for managing the individual technologies. As will be described below, these issues include traffic management and network planning.

Figure 5:
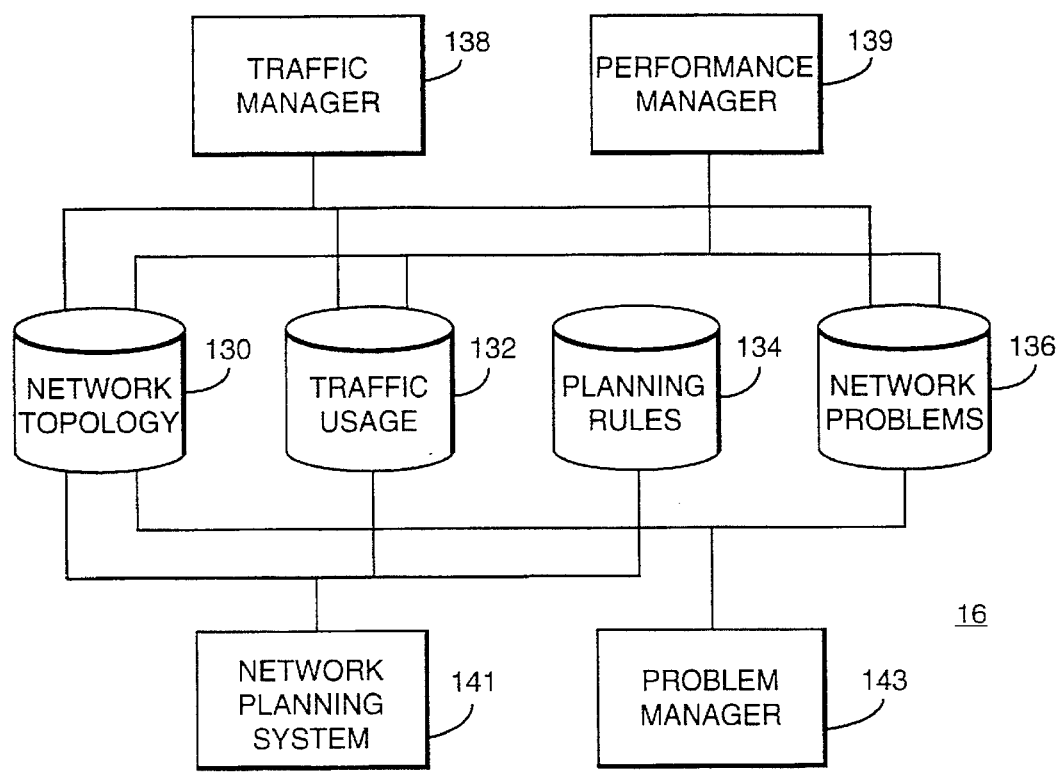
FIG. 5 is a block diagram of a domain for managing the network and forming part of the support structure shown in FIG. 2.

The general layout of the domain 16 is shown in FIG. 5. This domain has four databases, namely a database 130 containing details of the network topology, a database 132 which contains details of traffic usage, a database 134 which contains rules which are used in planning the network and a database 136 which contains details of traffic problems. The domain 16 also includes a traffic manager 138, a performance manager 139, a network planning system 141 and a problem manager 143.

The problem manager 143 receives fault reports from the other domains. By using information contained in the database 130 concerning the network topology, it correlates these faults and identifies the problems which are causing them. For example, it may receive reports of faults from a set of switches and also a set of multiplexers. By retrieving data on network topology from the database 130, it can correlate these faults end might identify the problem which is causing the faults as being caused by failure of a particular multiplexer. Identified problems are recorded in the database 136. The problem manager 143 sends instructions to the traffic manager 138, the service domain 14 or the technology domain 18 to restore lost service and to remove problems.

The traffic manager 138 receives traffic reports from the network 11. This data is analysed and used to prepare records which are stored in the database 132. The traffic manager 138 also identifies traffic problems such as congestion on traffic routes and switch overloads. By retrieving data on the network topology from database 130, data on traffic usage from database 132 and network problems from database 136, the traffic manager 138 finds solutions to traffic problems and then sends appropriate instructions to the other domains so as to reduce or overcome the problem. For example, by retrieving data from the database 136, it may find that traffic congestion at a particular switch is caused by failure of another switch. By retrieving data on network topology and traffic usage, it can then propose alternative routes so as to reduce the congestion, The performance manager 139 retrieves data from the databases 130, 132 and 136 and uses these data to provide performance reports.

The network planning system 141 receives proposals for new network designs to provide new services from the domain 64 which manages the service portfolio. By retrieving data from the databases 130, 132 and 134, the network planning system 141 can analyse a proposed change to the network and provide a report on its viability. The network planning system 141 also monitors the update of technology capacities and initiates network build in appropriate areas consistent with prospective service demands, technology capabilities, traffic management considerations, and cost. The network planning system 141 also tunes the rules used in databases 119, 134, 144 and 180.

The interfaces of the domain 16 comprise an interface to the network 11 for collection of traffic data, an interface to the domain 64 for use in planning modifications to the network, an interface to the domain 14 for handling requests relating to the provision of new service instances and resolving service problems, an interface to the domain 18 for receiving data on network faults and for transmitting requests for making changes in the network configuration, an interface to the domain 66 for handling problems arising in individual items of equipment and an interface to the domain 68 for transmitting requests for operations to be performed by workforce operatives.

As mentioned above, the domain 18 for managing the individual technologies is divided into segments. Each segment is responsible for managing an individual technology. When a new technology is added to the network, it is only necessary to add a new segment. Likewise, when a technology is removed, its segment is removed.

Figure 6:
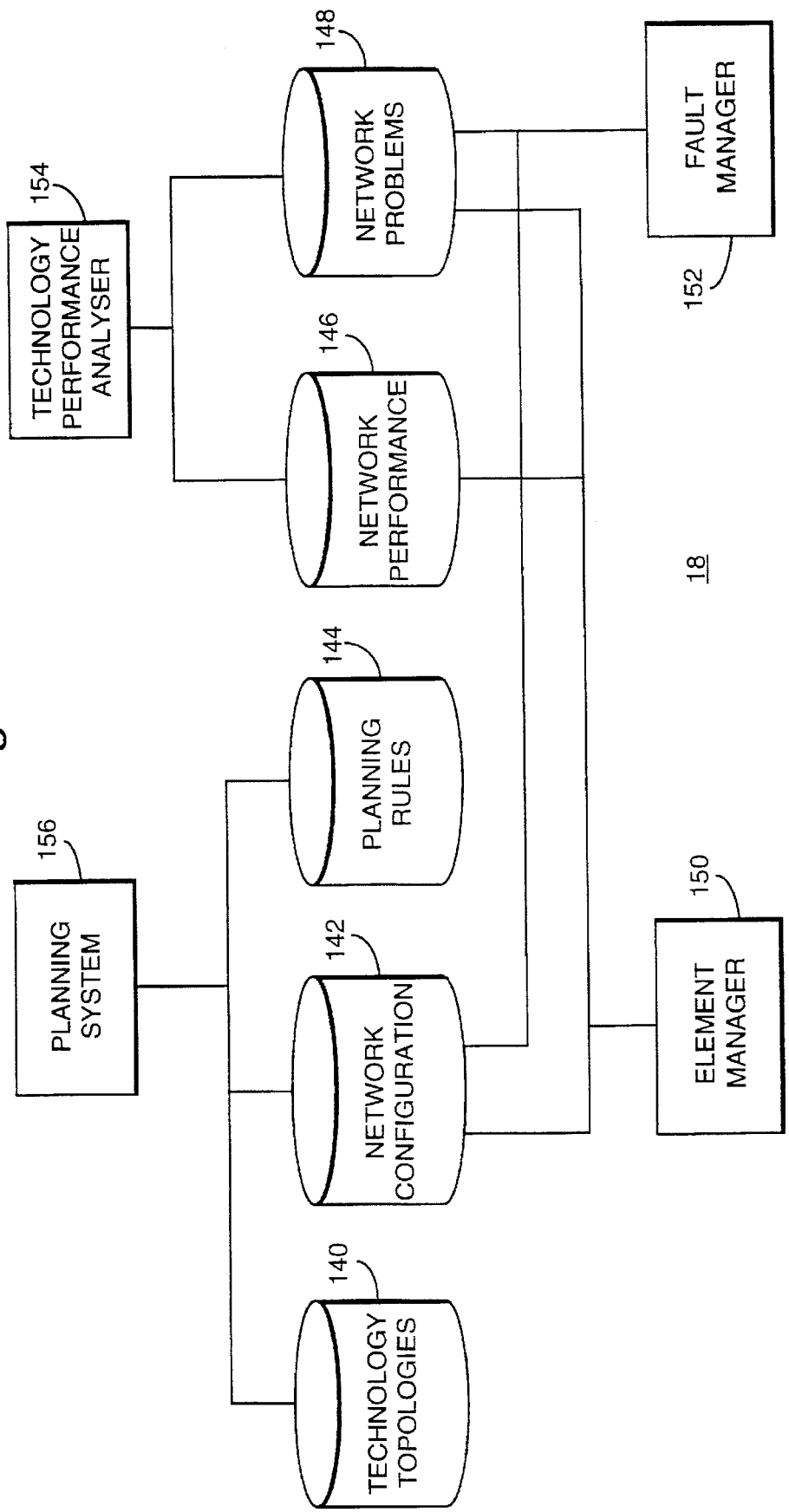
FIG. 6 is a block diagram of a domain for managing the individual technologies deployed in the network and forming part of the support structure shown in FIG. 2.

The general layout of one of the segments of the domain 18 is shown in FIG. 6. The segment includes databases 140, 142, 144, 146 and 148. The database 140 contains data on the topologies used in the particular technology. The database 142 contains data which describes how the network 11 is realised at the detailed level for the technology managed by the segment in terms of network components and their connections, functions, logical location, management capabilities and assigned and available capacity. The database 144 contains data on planning rules relevant to the technology. The database 146 contains data on measurements made against network configurations for the particular technology and performance data derived from the measurements. The database 148 contains data relating to problems which have been reported against network configurations for the technology and rules for restoring service. The segment also includes an element manager 150, a fault manager 152, a technology performance analyser 154 and a planning system 156. The element manager 150 and the fault manager 152 may be combined into a single system.

The element manager 150 receives requests from the domain 14, for changing the configuration of network elements and is responsible for transmitting instructions to these network elements to achieve the desired modifications. The element manager 150 receives data relating to the performance of network elements and it stores this data in the database 146.

The fault manager 152 retrieves faults reports from the service domain 14 and the network 11. In order to restore service which has been lost as a result of one or more faults, the fault manager 152 retrieves data on network problems and rules for restoring service from database 148 and data on network configurations from database 142 and identifies the action which needs to be taken to restore the lost service. In order to restore lost service, it then sends requests, as may be appropriate, to one or more of the network 11, the network domain 16, the equipment domain 66 and the work domain 68.

The technology performance analyser 154 analyses the data from databases 16 and 148 to assess the performance of the technology end transmits reports on the technology to the domain 14.

The planning system 156 uses data from the databases 140, 142 to monitor the usage of the elements which together provide the technology and, using data from the database 144, identifies spare capacity, The interfaces of the domain 18 include an interface to the network elements for configuring these claimants and for monitoring them, an interface to the domain 14 for receiving requests to configure the network to provide new services, restore loss of service and to provide reports on network performance, an interface to the domain 16 to transmit details of faults and problems arising within the technology, and an interface to the domain 66 to send requests or configuring individual items of equipment.

The domain 62 for managing billing problems is responsible for billing customers for usable of the network, managing customers' accounts and dealing with billing problems. The general layout of this domain is shown in FIG. 7.

Figure 7:
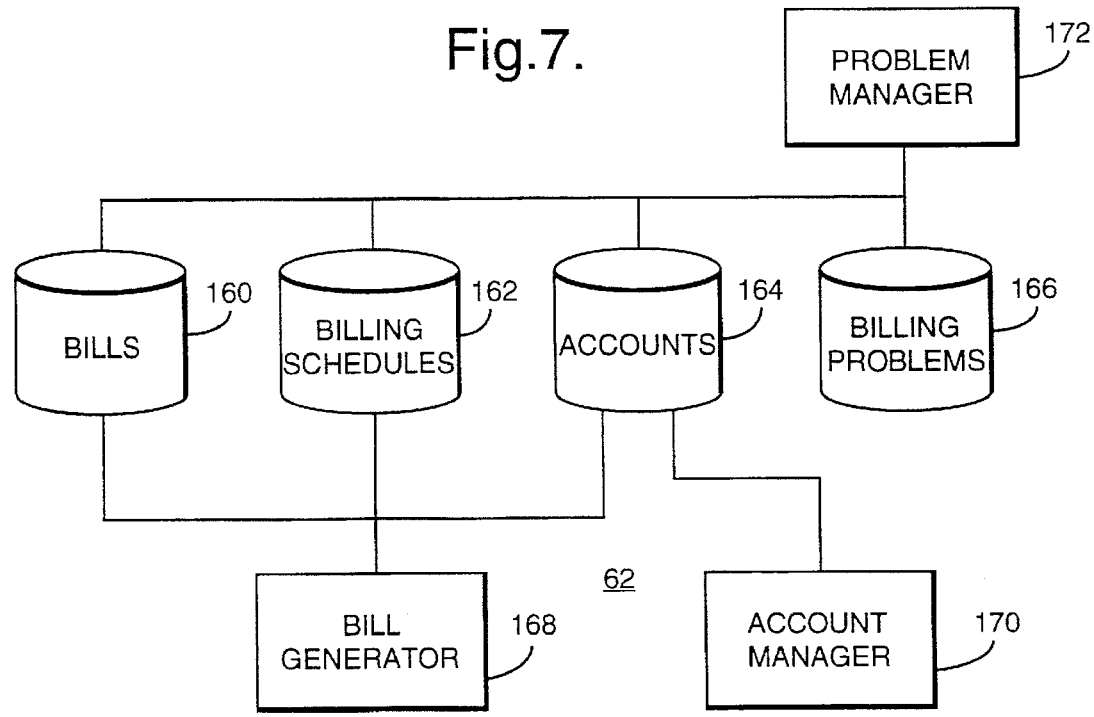
FIG. 7 is a block diagram of a domain for managing billing operations and forming part of the support structure shown in FIG. 2.

Referring now to FIG. 7, the domain 62 has four databases, namely a database 160 containing a record of each bill transmitted to a customer, a database 162 containing billing schedules, a database 16 containing, details of customers' accounts and a database 166 containing a record of each billing problem. The domain 62 also comprises a bill generator 168, an account manager 170 and a billing problem manager 172.

The bill generator 168 collects data on services provided to customers from the domain 14 and also data on billable events from the Individual switches of the network. Using the collected data and the billing schedules contained in the database 182, it prepares bills for transmission to customers. It sends details of each bill to he database 160 for storage. It also transmits data from the customers' bills to the database 164.

The account manager 170 manages the customers' accounts by retrieving data from the database 164 and generates accounts for transmission to customers.

The billing problem manager 172 receives billing problems from the domain 12. By retrieving data from the databases 160, 162, 164, 166, it analyses these problems and transmits responses back to the domain 12.

The interfaces of the domain 62 comprise an interface to the domain 12 for dealing with billing problems, an interface to the domain 14 for receiving details of services instances and, in appropriate cases, for transmitting instructions to restrict the provision of services to customers whose credit position is unsatisfactory and an interface to the network itself to receive data on billable events.

The domain 64 is responsible for managing the services when viewed as a portfolio. The functions performed by this domain comprise developing new services, launching new services and withdrawing old services.

Figure 8:
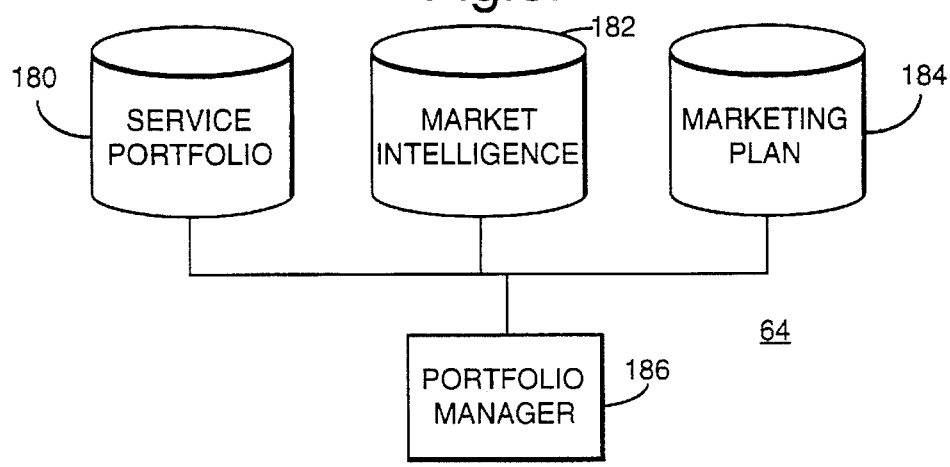
FIG. 8 is a block diagram of a domain for managing the portfolio of services provided by the network and which forms part of the support structure shown in FIG. 2.

The general layout of domain 64 is shown in FIG. 8. As shown, this domain has three databases, namely, a database 180 containing the rules which define the technology configurations which may be used to provide the various services which form the portfolio or available services end also general details, such as price and functions performed for each service, a database 182 which contains market intelligence and a database 184 which is used for storing marketing plans. The domain 64 also has a portfolio manager 186.

In order to develop a new product the domain 64 obtains data from the domains 16, 66 and 68. The data from the domain 16 is used to design modifications of the network for providing a new service. The data from the domain 66 is used to assess the capability of the equipment deployed in the network to provide a new service. The data from the domain 68 is used to access, the availability of the workforce to perform the operations which are required in introducing a new service. The portfolio manager 183 also obtains data on market intelligence from the database 182 when developing a new service.

In order to launch a new service, a marketing plan is developed and this stored in the database 184. Also, data on the new service is supplied to the domain 14 so that it has the necessary information to configure each instance of the new service. In response to requests from customers, information on services is supplied to the domain 12, In order to withdraw an existing service, appropriate instructions are transmitted to the domain 14, The interfaces or the domain 64 include an interface to the domain 16 for obtaining network information, an interface to the domain 66 for obtaining information on equipment, an interface to the domain 68 for obtaining information on the workforce, an interface to the domain 14 for transmitting information on services to be introduced and services to be withdrawn and an interface to the domain 12 to provide information to customers on new services.

The domain 66 for managing the individual items of equipment is responsible for monitoring the location and specification of each item, monitoring equipment performance, scheduling routine equipment maintenance and monitoring equipment faults.

Figure 9:
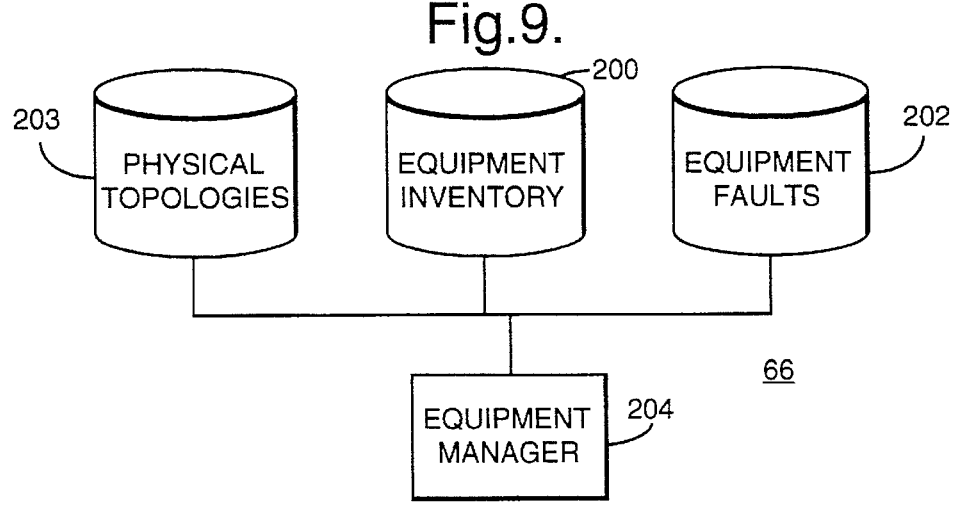
FIG. 9 is a block diagram of a domain for managing the individual items of equipment used in the network forming part of the support structure shown in FIG. 2.

The general layout of the domain 66 is shown In FIG. 9. This domain has three databases, namely, a database 200 containing a complete inventory of equipment deployed in the network 11, a database 202 containing details of equipment faults end a database 203 which describes the physical infrastructure of the network in terms of where equipment is located. More specifically, the database 200 contains the specification and location of each item of equipment and details of its performance. The domain 66 also has an equipment manager 204.

When a new item of equipment is installed, the equipment manager 204 enters the details of its specification and location into the database 200. If the equipment is either moved or modified, the equipment manager 204 enters these details into the database 200. Reports on equipment performance are received by the equipment manager 204 and stored in the database 200. The equipment manager 204 analyses the performance data in order to identify appropriate repair before a deterioration in performance affects service to the customers. The equipment manager 20, also schedules routine maintenance and testing of equipment from the details of the equipment stored in database 200. When a fault is reported to the equipment manager 204, it analyses the reported fault in relation to the information an the equipment stored in database 200 and also data on previous faults stored in database 202 in order to identify the exact nature and location of the fault and the action needed to remove the fault. Details of the fault are then stored in the database 202. Instructions to remove the fault are transmitted to the domain 68.

The interfaces of the domain 66 include an interface to the domain 14 for transmitting data relating to the installation or modification of equipment, an Interface to the domain 18 and also to the network itself to receive reports on equipment performance and faults an interface to the domain 64 for supplying information to this domain in connection with proposed new service, an interface to the domain 18 for obtaining details of the configuration of equipment when newly installed and details of equipment performance and an interface to the domain 68 to request jobs to be performed by operatives on equipment.

Figure 10:
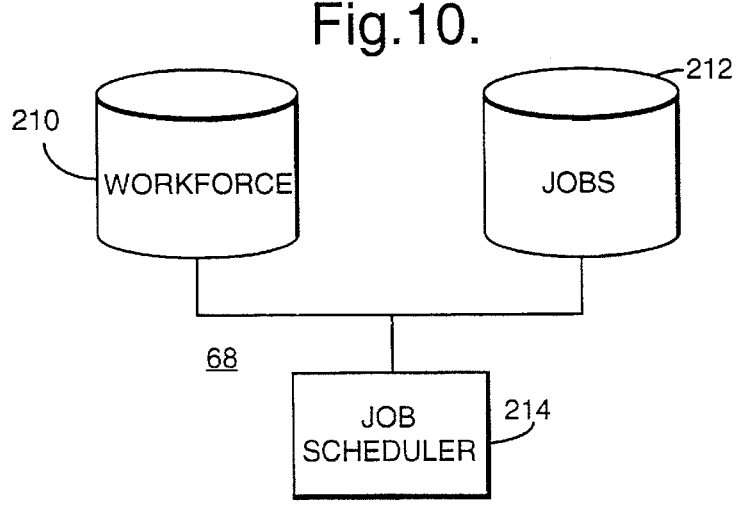
FIG. 10 is a block diagram of a domain for managing jobs performed by the networks human workforce and forming part of the support structure shown in FIG. 2.

As mentioned above, the domain 68 for managing jobs performed by the workforce is divided into two segments. The general layout of each of these segments is the same and the layout of one of these segments is shown in FIG. 10. This segment will now be described in more detail.

Referring now to FIG. 10, the segment comprises a database 210 containing details of the individual members of the workforce including their skills and locations, and a database 212 containing a list of jobs to be performed. The segment also has a job scheduler 214. Both databases 210 and 212 are updated by the job scheduler 214, The job scheduler 214 reserves human resources for jobs which are scheduled for execution at a future date. At this stage, the human resources are not reserved in terms of named Individuals. Where changes occur in jobs scheduled for execution at a future date, the reservation of human resources is changed accordingly.

The job scheduler 214 also matches the skills of members of the workforce to jobs which are due to be performed and thus provides a schedule of jobs to be performed by appropriate named members of the workforce. Details of the jobs are transmitted to the named members of the workforce. The job scheduler 214 monitors the execution of the jobs.

The Job scheduler 214 also models resource availability for prospective work.

The interface of the domain 68 include an interface to the domain 14 for receiving instructions for installing and modifying equipment, an interface to the domain 66 receiving instructions for performing routine maintenance and repair jobs, an interface to the domain 16 for receiving requests to repair faulty network elements and an interface to the domain 64 for supplying information in relation to prospective work.

Figure 12:
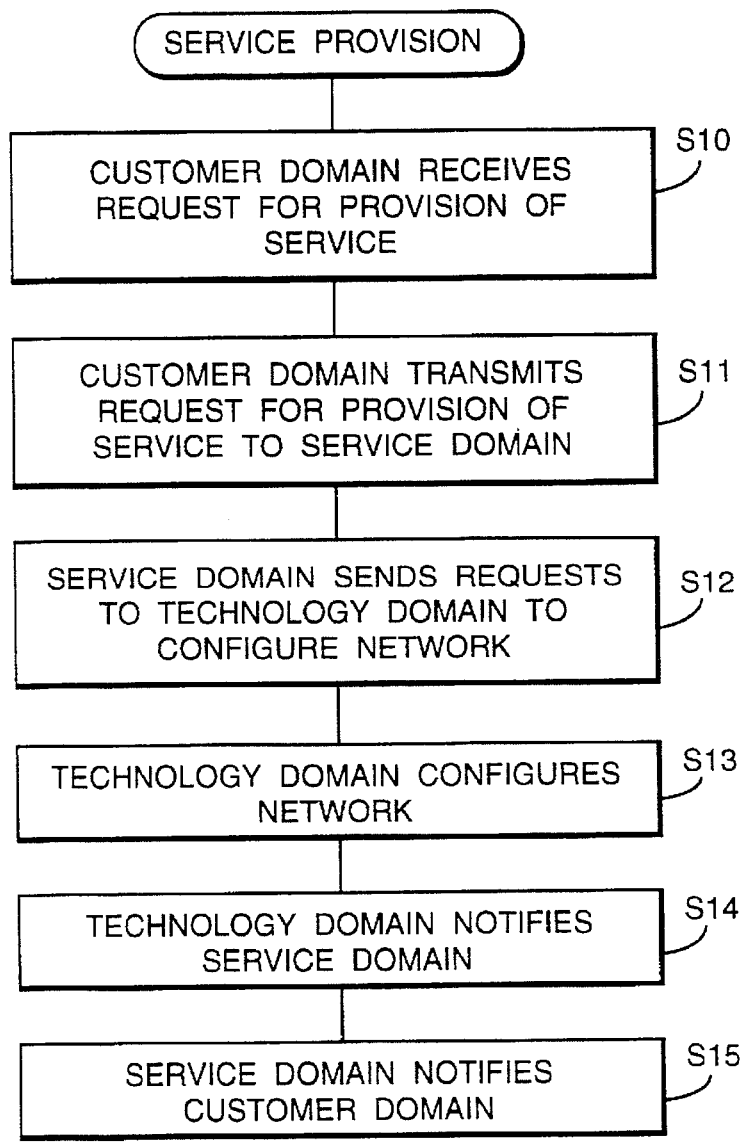
FIG. 12 is a flow chart of the steps which are performed in providing a service.

Referring now to FIG. 12, there is shown a flow chart of the steps performed by the operational support structure in order to provide a new service to a customer, Initially, in a step S10, the customer domain 12 receives a request for a new service from a customer. With the aid of the customer handling system 104, a human operator discusses the requirements for the new service with the customer. The customer domain 12 automatically passes details of the prospective new service to the service domain 14, initially for analysis. In the service domain 14, the section 13 automatically passes details of the prospective service to the appropriate segment in section 15. In the appropriate segment, the service management system 120 correlates the details of the prospective service with information about the services presently provided to the customer and automatically selects the most appropriate technology or technologies for the new service. In this segment, the service management system 120 also automatically accesses the rules in database 119 in order to define the technology configuration which is needed to provide the prospective service. If the prospective service is large or complicated, the service domain 14 requires the technology domain 18 to carry out checks on the network capacity which is required to provide the service. The service domain then automatically sends details of the technology configuration required to provide the service to the customer domain 12. The operator discusses these details with the customer.

When the details of the prospective service have been agreed with the customer, in a step S11 the customer domain automatically transmits a request for the provision of an instance of a new service to the service domain 14. The request is passed to the appropriate segment in section 15. In this segment, the service management system then automatically sends one or more requests to the technology domain 18 to configure the network components belonging to the relevant technology or technologies so as to provide the required service, In a step S13, the requests are passed to the appropriate segments in the technology domain 18 and, in each segment, the element manager 150 automatically configures the relevant network elements to provide the new service. When physical intervention is required before the network components can be configured electronically, the technology domain sends appropriate requests to the equipment domain 66 and the work domain 68.

When the network component have bean configured to provide the now services in a steps S14, the technology domain 18 automatically notifies the service domain 14 that the network has been configured to provide the new service. In the service domain 14, the details of the technology configuration used to provide the service between two end points in the network are entered into database 114. In the case of a 2 megabit/second between two end points, the details would specify the technology (for example coaxial cable or SDH) used for each leg of the the customer domain 12. The customer domain 12 then automatically instructs the billing domain 62 to initiate billing.

Referring now to FIG. 13, there is shown a flow chart of the steps performed by the operational support structure in order to restore a service to a customer.

In a step S20, the customer handling system 104 in the customer domain receives a problem report from a customer. The problem report may be received electronically or via a human operator, In the service domain 14, the section 13 transmits details of the problem to the relevant segment in section 15. In this segment, the service management system 120 identifies the technology which is causing the problem end then. In a step S22, the service domain automatically sends details of the problem, including the identified technology, to the technology domain 18.

In the technology domain 18, details of the problem are passed to the relevant segment. In this segment, the fault manager 152 analyses the problem by correlating it with previously recorded problems to identify the problem inerdependencies. Then, in a step S23, using the restoration rules contained in database 148, this segment determines if service can be restored by electronically reconfiguring network elements under he control of the technology domain 18. If service can be restored by electronically reconfiguring network elements, in a step S24, the element manager 150 in the segment electronically reconfigures the relevant network elements so as to restore the service.

If it is not possible to restore the service by reconfiguring network elements, in a step S25, the technology domain automatically sends details of the problem to the network domain 16. Then, in a step S26, the network domain analyses the problem and restores service.

In order to analyse the problem and restore service, the problem manager 143 in the network domain 16 correlates information across technologies and identifies areas of possible network-wide problems, if the loss of service is caused by network congestion, the traffic manager 138 applies network routing centrals. If service can be restored by using a different technology, the network domain informs the service domain 18 of this. The service domain 14 then instructs the technology domain 18 to provide the service using a new technology. If service can only be restored with manual intervention, the network domain 16 sends an instruction to the technology domain 18 to achieve the required manual intervention. The technology domain 18 then sends appropriate instructions to the equipment domain 86 and the work domain 68.

We claim:

1. An operational support structure for, and in combination with, a telecommunications network, said telecommunications network deploying a set of individual technologies and providing a set of services to customers of the network;

said operational support structure being divided into a set of domains each of which provides an individual management function for the network, each domain being implemented by at least one computer;

where a domain includes more than one computer, the individual computers which implement the domain being tightly integrated;

each domain comprising at least one database containing data related to the management function provided by the domain, at least one system for performing operations related to the management function provided by the domain, said at least one system having access to said data related to the management function provided by the domain, and an interface between the domain and at least one other domain;

the interfaces between the individual domains being implemented primarily as message passing interfaces;

said domains including:
a domain for managing customer handling functions;
a domain for managing instances of individual services provided by the network;
a domain for managing individual technologies deployed in the network; and
a domain for performing network management operations;

the domain for managing customer handling functions including a customer handling system arranged to receive a request from a customer for the provision of a new service and to transmit a request for the provision of a now service to the domain for managing the individual services;

the domain for managing the individual services including a service management system and a database containing details of the technology configurations which are required to provide network services, said service management system being arranged to receive a request for a new service from the domain for managing customer handling systems, to determine the technology configuration required using at least one of the technologies deployed in the network to provide the new service, and to send a request to the domain for managing the individual technologies to configure the network to provide the now service; and the domain for managing the individual technologies including an element manager system, said element manager systems being arranged to receive a request from the domain for managing the individual services to configure the network to provide a new service, and to configure the networks in response to such a request.

2. An operational support structure as in claim 1, in which the domain for managing individual technologies is divided into a set of segments each of which manages a respective one of said technologies, each segment having an individual element manager system.

3. An operational support structure as in claim 1, in which the domain for managing individual services is divided into a set of segments each of which manages instances of an individual group of services, each segment having an individual database containing details of technology configurations which are required to provide services of a respective group of services and an individual service management system.

4. An operational support structure as in claim 2, in which the domain for managing individual services is divided into a set of segments each of which manages instances of an individual group of services, each segment having an individual database containing details of technology configurations which are required to provide services of a respective group of services and an individual service management system.

5. An operational support system as in claim 1 in which the domains further include a domain for managing billing operations, said domain for managing billing operations including a bill generator system which is arranged to receive details of billable events from the network and to generate bills using said details, and a database for storing details of bills.

6. An operational support system as in claim 1 in which the domains further include a domain for managing individual items of equipment used in the network to form the elements of the network, said domain for managing individual items of equipment including a database containing an equipment inventory and an equipment manager system.

7. An operational support system as in claim 1 in which the domains further include a domain for managing physical jobs performed on the network by a human workforce, said domain for managing jobs comprising a database containing data relating to individual members of the workforce, a database containing data on jobs to be performed and a job scheduler system.

8. An operational support system as in claim 1 in which the domains further include a domain for managing the services provided by the network when grouped together as a portfolio of services, said domain including a portfolio manager system.

9. An operational support structure for, and in combination with, a telecommunications network, said telecommunications network deploying a set of individual technologies and providing a set of services to customers of the network;

said operational support structure being divided into a set of domains each of which provides an individual management function for the network, each domain being implemented by at least one computer;

where a domain includes more than one computer, the individual computers which implement the domain being tightly integrated;

each domain comprising at least one database containing data related to the management function provided by the domain, at least one system for performing operations related to the management function provided by the domain, said at least one system having access to said data related to the management function provided by the domain, and an interface between the domain and at least one other domain;

the interfaces between the individual domains being implemented primarily as message passing interfaces;

said domains including;
a domain for managing customer handling functions;
a domain for managing instances of individual services provided by the network;
a domain for managing individual technologies deployed in the network; and
a domain for performing network management operations;

the domain for managing customer handling functions including a customer handling system arranged to receive a report from a customer relating to a problem which has caused a loss of service and to transmit details of the problem report to the domain for managing the individual services;

the domain for managing individual services including a service management system which is arranged to receive the details of the problem report from the domain for managing customer handling functions, to identify the technology which is causing the problem and to transmit details of the problem to the domain for managing the individual technologies;

the domain for managing individual technologies including a fault manager system which is arranged to receive details of a problem causing a loss of service from the domain for managing the individual services, to determine if service can be restored by reconfiguring the network, and, where possible, to reconfigure the network so as to restore the lost service.

10. An operational support structure as in claim 9 in which the domain for managing the individual technologies includes a database containing rules for restoring service, the fault manager system using said rules when determining if service can be restored.

11. An operational support structure as in claim 9 in which, in the domain for managing individual technologies, the fault manager system is arranged to transmit details of the problem causing the loss of service to the domain for managing the network where service cannot be restored by reconfiguring the network; and the domain for managing the network includes a problem manager system which is arranged to receive details of a problem causing a loss of service from the domain for managing the individual technologies and to analyze the problem causing loss of service.

12. An operational support structure as in claim 10 in which, in the domain for managing individual technologies, the fault manager system is arranged to transmit details of the problem causing the loss of service to the domain for managing the network where service cannot be restored by reconfiguring the network; and the domain for managing the network includes a problem manager system which is arranged to receive details of a problem causing a loss of service from the domain for managing the individual technologies and to analyze the problem causing loss of service.

13. An operational support system as in claim 9 in which the domains further include a domain for managing billing operations, said domain for managing billing operations including a bill generator system which is arranged to receive details of billable events from the network and to generate bills using said details, and a database for storing details of bills.

14. An operational support system as in claim 9 in which the domains further include a domain for managing individual items of equipment used in the network to form the elements of the network, said domain for managing individual items of equipment including a database containing an equipment inventory and an equipment manager system.

15. An operational support system as in claim 9 in which the domains further include a domain for managing physical jobs performed on the network by a human workforce, said domain for managing jobs comprising a database containing data relating to individual members of the workforce, a database containing data on jobs to be performed and a job scheduler system.

16. An operational support system as in claim 9 in which the domains further include a domain for managing the services provided by the network when grouped together as a portfolio of services, said domain including a portfolio manager system.

17. An operational support structure for, and in combination with, a telecommunications network, said telecommunications network deploying a set of individual technologies and providing a set of services to customers of the network;

said operational support structure being divided into a set of domains each of which provides an individual management function for the network, each domain being implemented by at least one computer;

where a domain includes more than one computer, the individual computers which implement the domain being tightly integrated;

each domain comprising at least one database containing data related to the management function provided by the domain, at least one system for performing operations related to the management function provided by the domain, said at least one system having access to said data related to the management function provided by the domain, and an interface between the domain and at least one other domain;

the interfaces between the individual domains being implemented primarily as message passing interfaces;

said domains including:

a domain for managing customer handling functions which includes a customer handling system;

a domain for managing instances of individual services provided by the network which includes a service management system;

a domain for managing individual technologies deployed in the network which includes at least one element manager system; and a domain for performing network management operations which includes a problem manager system.

18. An operational support structure as in claim 17 in which the domains further include a domain for managing billing operations, said domain including a bill generator system arranged to receive details of billable events from the network and to generate bills using said details.

19. An operational support structure as in claim 17 in which the domain for managing individual technologies is divided into a set of segments each of which manages a respective one of said technologies, each segment having an individual element manager system.

20. An operational support structure as in claim 18 in which the domain for managing individual technologies is divided into a set of segments each of which manages a respective one of said technologies, each segment having an individual element manager system.

* * * * *